United States Patent [19]
Wagensonner

[11] Patent Number: 5,696,616
[45] Date of Patent: Dec. 9, 1997

[54] SCANNING METHOD AND APPARATUS

[75] Inventor: Eduard Wagensonner, Aschheim, Germany

[73] Assignee: AGFA-Gevaert AG - Fototechnik, Munich, Germany

[21] Appl. No.: 433,134

[22] Filed: May 3, 1995

[30] Foreign Application Priority Data

May 9, 1994 [DE] Germany ............... 44 16 314.2

[51] Int. Cl.$^6$ .................................................. G02B 26/08
[52] U.S. Cl. .................. 359/201; 359/204; 359/200; 347/134; 355/233; 358/474; 358/487
[58] Field of Search ................. 359/201, 204, 359/212, 223, 224, 227, 900; 348/770, 771, 785, 203; 347/232, 241, 243, 244, 256, 258–260, 134, 135; 346/107.1; 358/515, 505, 474, 482, 483, 487, 296, 302; 355/229, 232, 233

[56] References Cited

U.S. PATENT DOCUMENTS

| | | |
|---|---|---|
| 4,571,603 | 2/1986 | Hornbeck et al. |
| 4,755,013 | 7/1988 | Setani . |
| 5,041,851 | 8/1991 | Nelson ........................ 347/134 |
| 5,206,629 | 4/1993 | DeMond et al. . |
| 5,223,969 | 6/1993 | Jeandeau . |

FOREIGN PATENT DOCUMENTS 35 25 807 C1   12/1986   Germany .
38 07 659 C2   12/1989   Germany .

OTHER PUBLICATIONS

IEEE Spectrum Nov. 1993, pp. 27–31, Mirrors On A Chip, Jack M. Younse.

*Primary Examiner*—James Phan
*Attorney, Agent, or Firm*—Darby & Darby

[57]  ABSTRACT

A scanner has a light sensing unit, and a reflecting unit which reflects light to the sensing unit either directly or indirectly. The reflecting unit receives light from an object being scanned or from a light source. In the former case, the light is reflected to the sensing unit directly. In the latter case, the light is reflected to the sensing unit indirectly. Thus, the reflecting unit directs light to an object being scanned and the object transmits or reflects the light to the sensing unit. The reflecting unit is made up of a series of micromirrors, and each of the micromirrors corresponds to a respective point of the object being scanned. The micromirrors are independently movable between rest positions in which they reflect light away from the sensing unit and active positions in which they reflect light towards the sensing unit. The micromirrors are successively moved from the rest positions to the active positions and back to the rest positions so that only one micromirror at a time directs light to the sensing unit. In this manner, scanning is accomplished point-by-point. The scanner can be used in a photographic copier to measure the densities of film frames and thereby regulate the exposure times during copying.

25 Claims, 5 Drawing Sheets

SCANNING METHOD AND APPARATUS

FIELD OF THE INVENTION

The invention relates to the scanning of objects.

BACKGROUND OF THE INVENTION

Many systems exist for recording images of objects. On the one hand, there are cameras, e.g., television or video cameras, for photographing moving objects. On the other hand, there are all kinds of still cameras for photographing stationary objects, as well as scanners for sensing reproductions.

Television and video cameras use recording tubes to generate electronic image signals. However, new digital techniques are being employed more and more frequently and, for these techniques, the classical recording tubes are replaced by CCDs. A major problem with CCDs is that their dynamic range is relatively small. To achieve adequate reproduction quality with a CCD camera, it is accordingly necessary to provide a relatively expensive intensity control unit. CCDs also have additional problems in that the signal-to-noise ratio is relatively low and in that the individual elements of a CCD frequently have different sensitivities. The image signals of a CCD, therefore, must generally be corrected. Moreover, due to the low outputs of CCDs, it is difficult to produce CCDs with large numbers of pixels. Hence, such CCDs are relatively expensive.

CCD scanners for recorded images have essentially the same drawbacks as cameras. Here, also, the small dynamic range and the low signal-to-noise ratio present a problem which has not been satisfactorily solved to date. Thus, when scanning films, which often have a dynamic range of 1:2000, there is the fundamental problem that this dynamic range is virtually unachievable by a CCD. For a fast, high-resolution scanner with a pixel rate of several million per second, the dynamic range of a film can be obtained only at great expense, if at all.

By way of example, a CCD scanner is disclosed in the German patent 35 25 807 C1.

Laser beam scanners for the scanning of reproductions or stationary objects are also known and employ polygonal or oscillatory reflectors. Such a scanner is described, for instance, in the German patent 38 07 659 C2. However, the scanning times for laser beam scanners are relatively long and the scanning of colored reproductions is relatively complicated.

SUMMARY OF THE INVENTION

It is an object of the invention to provide an image scanning method which allows an image to be scanned at relatively high speed.

Another object of the invention is to provide an image scanning method which enables relatively good image quality to be achieved.

An additional object of the invention is to provide an image scanning apparatus which permits relatively high resolution to be obtained.

A further object of the invention is to provide an image scanning apparatus which is capable of achieving a relatively large dynamic range.

It is also an object of the invention to provide an image recording apparatus which can record an image at relatively high speed.

Yet another object of the invention is to provide a copying apparatus which is able to generate copies having relatively high resolution.

Still a further object of the invention is to provide a copying apparatus which can produce satisfactory copies of images having a relatively large dynamic range.

The preceding objects, as well as others which will become apparent as the description proceeds, are achieved by the invention.

One aspect of the invention resides in a method of scanning an object using radiation sensing means. The method comprises irradiating a set of reflective surfaces corresponding to different regions of the object with radiation traveling away from or towards the object. The method additionally comprises adjusting the reflective surfaces independently of one another to successively direct radiation from respective ones of the object regions to the sensing means.

The irradiating step may include projecting an image of the object onto the reflective surfaces. The adjusting step may then involve successively reflecting respective regions of the image to the sensing means.

Alternatively, the irradiating step can include conducting radiation to the reflective surfaces from a source of radiation. Here, the adjusting step comprises successively reflecting the conducted radiation to respective ones of the object regions and to the sensing means.

The reflective surfaces may have first positions in which they direct radiation away from the sensing means and second positions in which they direct radiation towards the sensing means. The adjusting step can then involve moving the reflective surfaces from the first positions to the second positions and back to the first positions.

The method may further comprise splitting the radiation reflected from the reflective surfaces into a plurality of spectral components upstream of the sensing means.

The invention is based on the recognition that a substantial improvement in image quality over that of cameras with CCD scanners can be achieved by projecting an image onto radiation sensing means using a set of reflective surfaces each of which corresponds to a respective region or point of the image. The image is broken up into discrete image regions or image points at the reflective surfaces and can subsequently be recorded by a radiation sensing means which is very fast and/or has extreme sensitivity and a large dynamic range. Only a single sensing means is necessary, and this sensing means can be adjusted to the particular requirements without great expense.

Another advantage of the invention is that all color information of a colored image is retained at the reflective surfaces. The image is broken up into discrete regions or points at the reflective surfaces and, due to the retention of all color information, the individual regions or points can be recorded relatively inexpensively by radiation sensing means. By interposing filters or the like between the sensing means and a colored object whose image is being recorded, individual color components of the object can be readily detected by the sensing means.

Another aspect of the invention resides in an apparatus for scanning an object. The apparatus comprises a set of reflective elements corresponding to different regions of the object, and means for irradiating the reflective elements with radiation traveling away from or towards the object. The apparatus further comprises means for sensing radiation, and means for adjusting the reflective elements independently of one another to successively direct radiation from respective ones of the object regions to the sensing means.

An additional aspect of the invention resides in an apparatus for copying a master. Such apparatus comprises first means for determining the densities of different regions of the master, second means for making a copy of the master on copy material, and means connecting the first and second means to one another. The first means includes means for scanning the master, and the scanning means encompasses a set of reflective elements which respectively correspond to the different master regions, and means for adjusting the reflective elements independently of one another to successively scan the respective master regions. The second means includes means for exposing the copy material, and means for controlling the exposing means as a function of the densities of the master.

Additional features and advantages of the invention will become apparent from the following description of preferred embodiments when read in conjunction with the accompanying drawings.

DESCRIPTION OF PREFERRED EMBODIMENT

Figure 1:
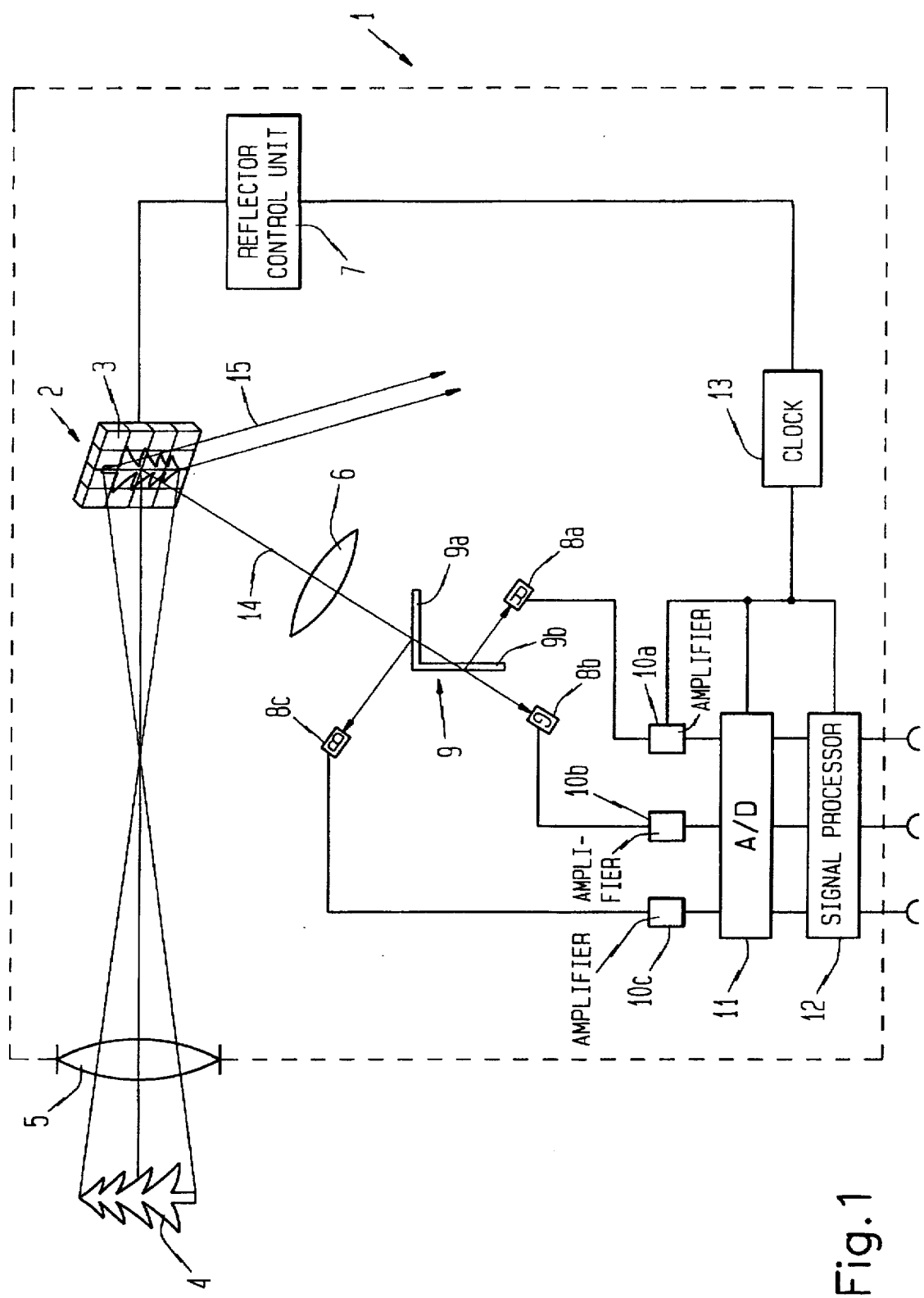
FIG. 1 schematically illustrates a video camera in accordance with the invention.

FIG. 1 shows a video camera 1 which is being used to photograph a scene including an object 4. The camera 1 comprises an objective 5, an electronically controlled reflecting unit 2, and a focusing lens 6 which focuses the reflecting unit 2 on a light splitting unit 9 or on a light sensing arrangement or means. The light sensing arrangement includes three optoelectronic sensors in the form of photodiodes 8a, 8b and 8c. Each of the sensors 8a,8b,8c is sensitized to one of the primary colors red, green and blue.

Part of the light which travels from the object 4 to the reflecting unit 2 is reflected towards the light splitting unit 9 as indicated by the light ray 14. The light splitting unit 9 comprises two dichroic filters 9a and 9b which split the light into three color or spectral components red, green and blue. The red, green and blue light components are detected by the respective sensors 8a,8b,8c which generate red, green and blue image signals. The red, green and blue image signals are amplified in respective amplifiers 10a, 10b and 10c and then sent to a signal processor 12 by way of an analog-digital converter 11. From the signal processor 12, the signals can be transferred to a magnetic band or digital image memory in a conventional manner.

The reflecting unit 2 is made up of a set of discrete reflectors or mirrors 3 which are arranged in a two-dimensional array and form a matrix. Each reflector 3 has a first or rest position in which it reflects light arriving from the object away from the focusing lens 6, light splitting unit 9 and sensors 8a,8b,8c. The direction of travel of the reflected light in the rest positions of the reflectors 3 is indicated by the light rays 15. The light rays 15 are absorbed by a non-illustrated black labyrinth. Each reflector 3 further has a second or active position in which it reflects incoming light from the object 4 towards the focusing lens 6, light splitting unit 9 and sensors 8a, 8b, 8c. The direction of travel of the reflected light in the active positions of the reflectors 3 is indicated by the previously mentioned light ray 14.

The reflectors 3 are movable independently of one another between the rest positions and the active positions. Movement of the reflectors 3 is controlled electronically by a reflector control unit 7. A clock 13 regulates the entire operation of the camera 1 over time.

Each of the reflectors 3 corresponds to a respective point or region of the object 4, and each of the reflectors 3 may be considered to represent a pixel. The reflectors 3 are successively adjusted in such a manner that, at any given moment, only one of the reflectors 3 directs the incoming light from the object 4 to the light splitting unit 9 and the sensors 8a,8b,8c. Thus, the reflector control unit 7 successively moves respective ones of the reflectors 3 from the rest position to the active position and back to the rest position. Since the reflectors 3 represent a matrix of points or pixels, the object 4 is accordingly scanned point-by-point or pixel-by-pixel.

The sensors 8a,8b,8c are capable of operating at a scanning frequency of 30 MHz. At an image resolution of 500,000 points, i.e., with a matrix of 768×651 reflectors 3, a frame frequency of 60 Hz can be obtained, for example. Information relating to the different color components of the object 4 can be processed synchronously because the sensors 8a,8b,8c operate synchronously with the clock 13.

The reflecting unit 2 is preferably constituted by a Digital Micromirror Device (DMD) of Texas Instruments, Dallas, Tex. These micromirror devices are available with a variety of resolutions, e.g., 2048×1152 pixels. They are digitally controlled and are described, for example, in U.S. Pat. No. 4,571,603, U.S. Pat. No. 5,206,629, IEEE Spectrum (Vol. 30, No. 11, November 1993, pp. 27–31) and Funkschau (October 1994, pp. 60–63).

Figure 2:
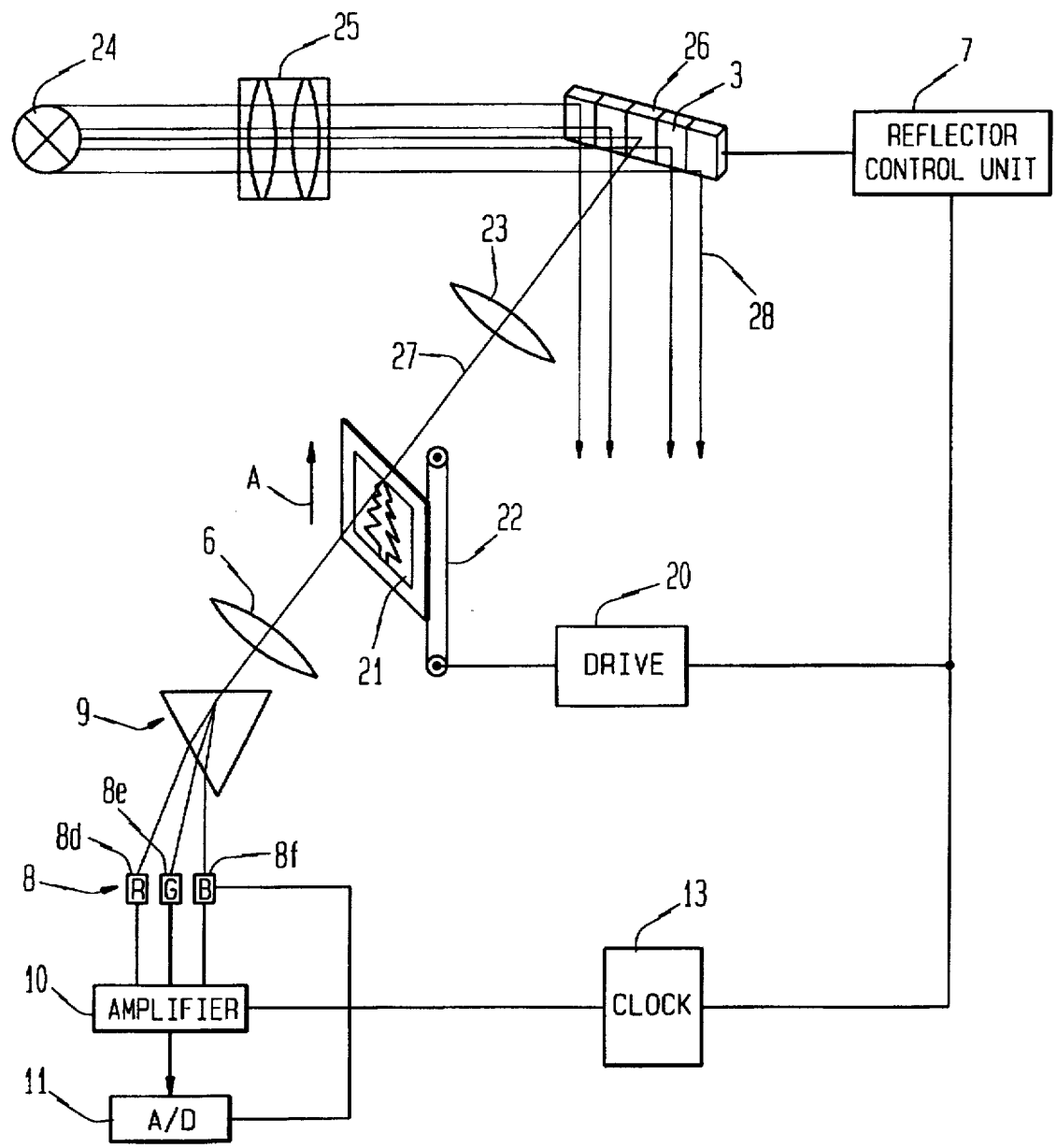
FIG. 2 schematically depicts one embodiment of a scanner according to the invention.

FIG. 2 illustrates a transmission scanner in which a master or original 21, which is here assumed to be a diapositive, is optoelectronically scanned point-by-point by transilluminating the master 21. The scanning operation is performed using a reflecting unit 26 which consists of a linear array of reflectors 3 rather than a two-dimensional array. It is preferred for the reflecting unit 26 to be in the form of a linear DMD.

The reflecting unit 26 is disposed in the optical path of the scanner between the master 21 and a light source 24. The light source 24 illuminates the reflecting unit 26 via a condenser 25, and the reflecting unit 26 reflects part of the light from the source 24 towards the master 21 as indicated by the light ray 27. The reflected light is focused on the master 21 by a focusing lens 23.

The master 21 is scanned at a set of points along each of a series of scan lines which extend parallel to the reflecting unit 26. To this end, the master 21 is shifted during scanning in a scanning direction A perpendicular to the reflecting unit 26 and the scan lines. As the master 21 shifts, different strip-like portions of the master 21 come into register with the reflecting unit 26 and are scanned. Shifting of the master 21 is accomplished by a belt 22 which is operated by a drive 20.

The reflectors 3 of the reflecting unit 26 are again movable independently of one another between rest positions and active positions. In the rest positions, the reflectors 3 reflect the light from the source 24 out of the optical path of the scanner so that the reflected light does not illuminate the master 21. The light which is reflected out of the optical path is indicated by the light rays 28. In the active positions, the reflectors 3 reflect the light from the source 24 along the optical path thereby illuminating the master 21. The light reflected along the optical path is indicated by the previously mentioned light ray 27.

When the master 21 is moved to bring an unscanned strip-like portion of the master 21 into register with the reflecting unit 26, each of the reflectors 3 corresponds to a respective point or region of the strip-like portion. The reflector control unit 7 successively moves respective ones of the reflectors 3 from the rest position to the active position and back to the rest position. Accordingly, each of the reflectors 3 momentarily reflects the light from the source 24 towards a respective point of the registering strip-like portion of the master 21. In this manner, the master 21 is scanned point-by-point. As before, each of the reflectors 3 may be considered to represent a pixel.

The light reflected towards the master 21 passes through the master 21 to the light splitting unit 9 which is here in the form of a prism. The light splitting unit 9 splits the light from the master 21 into the three color or spectral components red, green and blue which are focused on a light sensing arrangement 8 by the focusing lens 6. The light sensing arrangement 8 comprises three sensors 8d, 8e and 8f which are constituted by photomultipliers and are respectively sensitized to the primary colors red, green and blue. The sensors 8d, 8e, 8f generate red, green and blue image signals which are amplified in the amplifier 10 and subsequently digitized in the analog-digital converter 11. From the analog-digital converter 11, the red, green and blue image signals are forwarded to a non-illustrated image processing unit. The analog-digital converter 11, which has three outputs, yields a digital red-green-blue image with a resolution of 12 bits.

The clock 13 produces clocking signals for the reflector control unit 7, the drive 20, the sensors 8d, 8e, 8f, and the electronic circuitry downstream of the sensors 8d,8e,8f.

For the purpose of scanning the master 21, it is possible to shift the reflecting unit 26 instead of the master 21.

Figure 3:
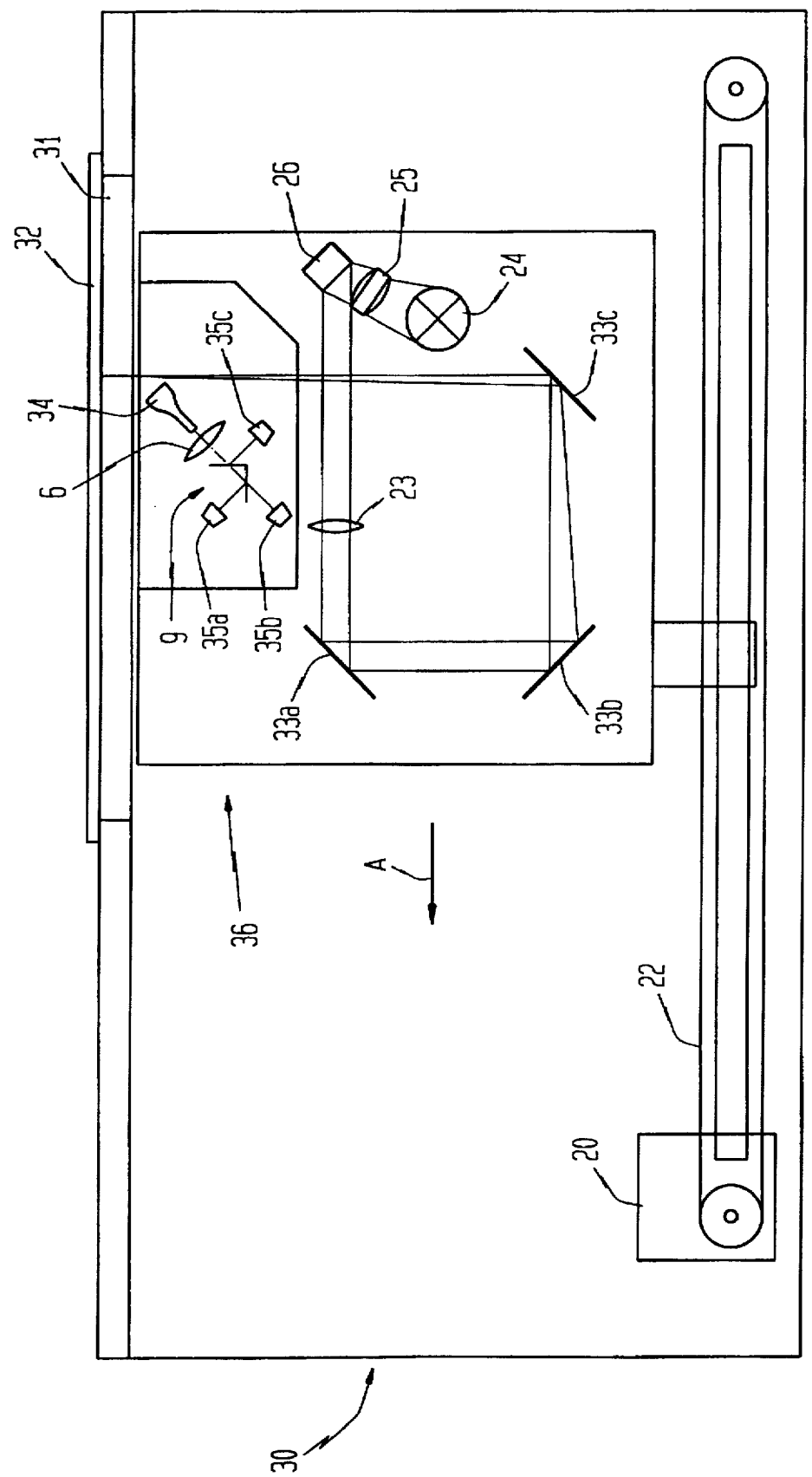
FIG. 3 schematically illustrates another embodiment of a scanner in accordance with the invention.

FIG. 3 depicts a reflecting scanner 30 which operates on the same principle as the transmission scanner of FIG. 2.

In FIG. 3, the linear reflecting unit 26 is moved relative to a master or original 32 which rests on a transparent support plate 31. The reflecting unit 26 constitutes part of an illuminating and scanning device 36 which is movable along the master 32 in the scanning direction A. The illuminating and scanning device 36 is shifted in the direction A through the agency of the belt 22 and the drive 20.

The illuminating and scanning device 36 includes the light source 24 which illuminates the reflecting unit 26 via the condenser 25. The device 36 further includes the objective 23, and the reflecting unit 26 reflects part of the light from the source 24 towards the objective 23. The light passing through the objective 23 travels to three reflectors 33a, 33b and 33c which direct the light onto the master 32.

The master 32 is scanned at a set of points along each of a series of lines. To this end, the illuminating and scanning device 36 is shifted in the scanning direction A. The individual reflectors of the reflecting unit 26 are successively adjusted so that, at any moment, only one of the reflectors of the reflecting unit 26 reflects the light from the source 24 towards the objective 23, and hence onto the master 32. The master 32 is thus scanned point-by-point.

At least part of the light impinging upon the master 32 is backscattered. The backscattered light is collected by a linear array or row 34 of optical fibers and directed to the light splitting unit 9. The light splitting unit 9 splits the backscattered light into the three color components red, green and blue which are focused on a light sensing arrangement by the focusing lens 6. The light sensing arrangement comprises three sensors 35a, 35b and 35c which are constituted by photomultipliers and are respectively sensitized to the primary colors red, green and blue.

The three color components are obtained simultaneously during scanning. Thus, the master 32 is scanned with white light and the three color components separated from one another subsequently. As a result, the scanning procedure of the invention is faster and more economical than other scanning procedures in which the three color components are derived by means of filters or color CCDs and scanning is performed successively in the three primary colors red, green and blue.

Figure 4:
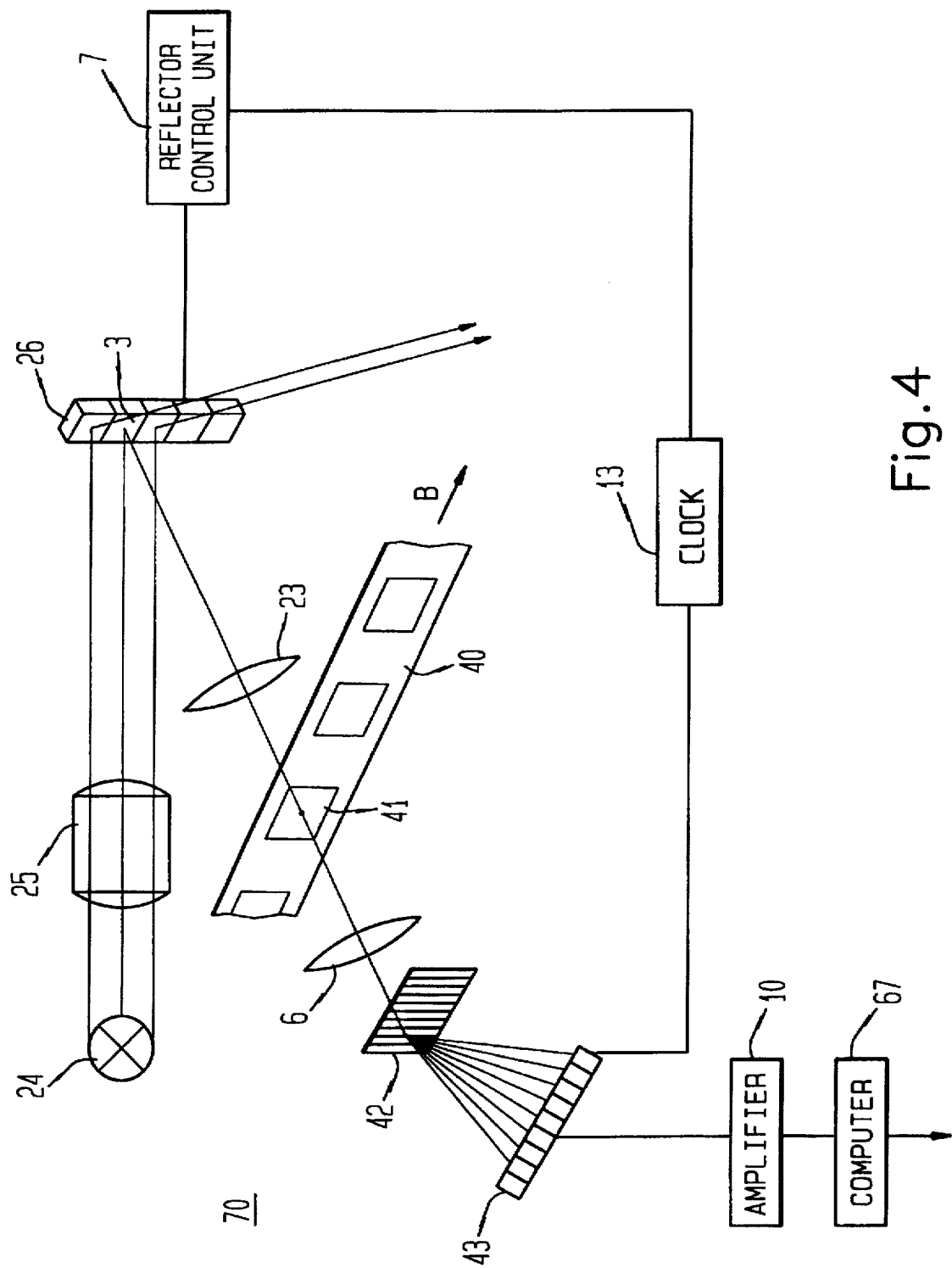
FIG. 4 schematically depicts an additional embodiment of a scanner according to the invention.

FIG. 4 shows a spectral scanner 70 which is used to analyze a frame or master 41 constituting part of a CN film. The frame 41 is illuminated by way of the light source 24, the condenser 25, the linear reflecting unit 26 and the objective 23 which focuses the reflecting unit 26 on the frame 41. Light from the source 24 which is reflected to the frame 41 by the reflecting unit 26 travels through the master 41 to an optical grating 42. The grating 42 splits the light coming from the frame 41 into spectral components. The spectral components, and hence the pixels making up the image of the frame 41, are focused by the focusing lens 6 on a linear array or row of light sensors 43 in the form of photodiodes. The sensors 43 generate spectral signals which are amplified in the amplifier 10 and sent to an electronic evaluating and calculating unit or computer 67.

The frame 41 is scanned at a set of points along each of a series of lines. This is accomplished by transporting the film 40 in the direction B during scanning of the frame 41 and by successively adjusting the individual reflectors of the reflecting unit 26 so as to direct light towards the frame. Consequently, the frame 41 is scanned point-by-point. The film 40 continues to move in the direction B after scanning of the frame 41 has been completed in order to successively scan the frames downstream of the frame 41.

The spectral signals from the scanner 70 can be used in a color copier to control the proportions of different spectral components in copying or printing light. Methods for controlling such proportions are well-known and such a method is disclosed, for example, in the German patent 28 40 287.

Figure 5:
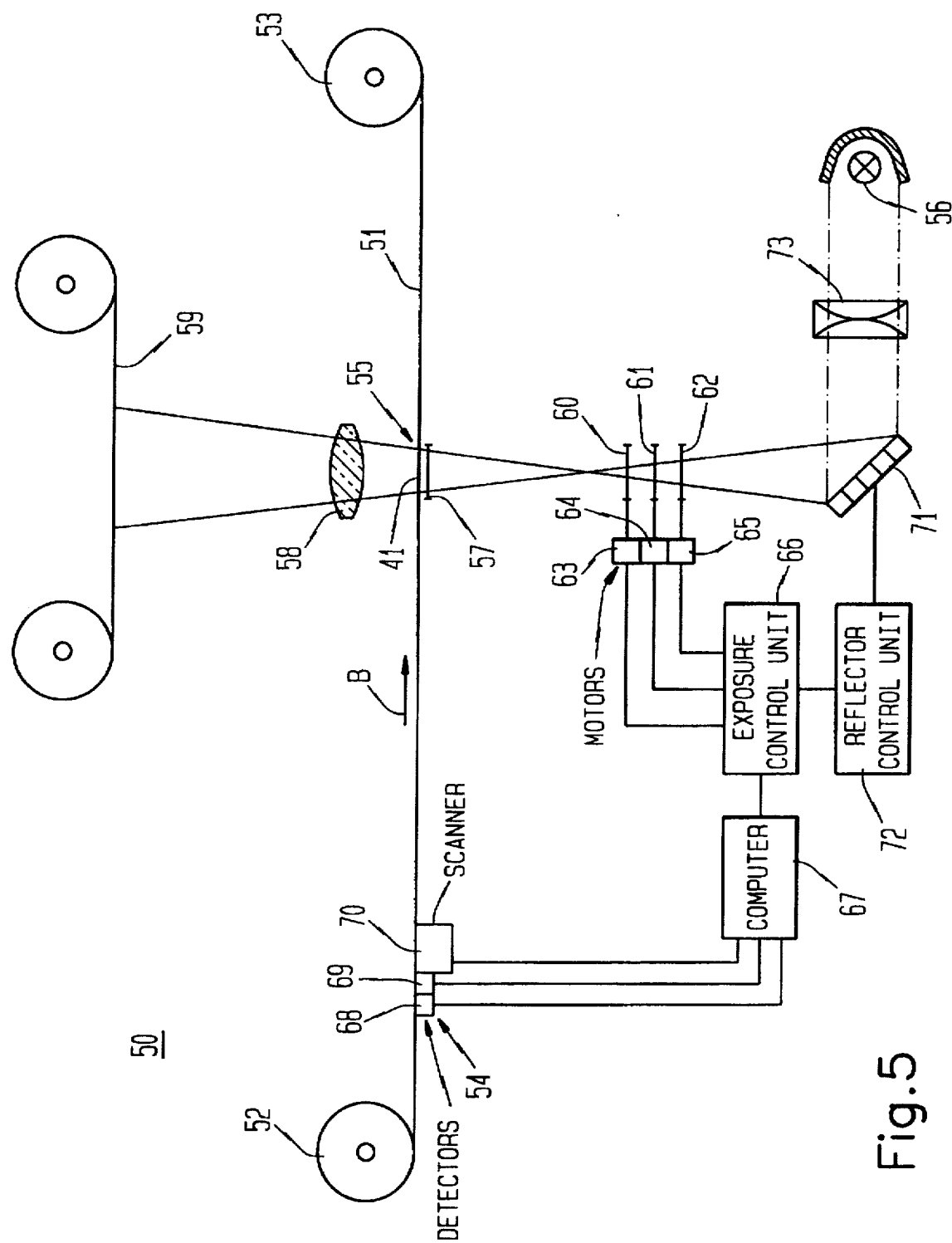
FIG. 5 schematically illustrates a copier in accordance with the invention.

FIG. 5 illustrates a photographic color copier 50 in which a series of films have been joined end-to-end to form a very long band 51. The band 51 is wound on a supply reel 52, and the band 51 is withdrawn from the supply reel 52 during copying and advanced in the direction B to a take-up reel 53. A copying station 55 is located between the reels 52 and 53, and the frames of the band 51 are printed on photographic copying paper 59, e.g., CN paper, at the copying station 55. In FIG. 5, a frame 41 of the band 51 is shown in the copying station 55.

A detecting and measuring station 54 is disposed upstream of the copying station 55. The station 54 includes a detector 68 which can sense the splices between adjoining films of the band 51 and a detector 69 which can sense perforations in the films. The detectors 68, 69 make it possible, for instance, to locate the leading end of a film constituting part of the band 51. The detecting and measuring station 54 further includes the spectral scanner 70 of FIG. 4 which is located downstream of the detectors 68, 69 and functions to measure the spectral characteristics of the individual frames of the band 51. In particular, the scanner 70 here serves to measure the densities of the respective frames for different spectral components of light. The measured densities are sent to the computer 67.

The computer 67 is connected to an exposure control unit 66 which regulates the proportions of different spectral components in the copying light. To this end, the exposure control unit 66 is connected to drive motors 63, 64 and 65 for respective color filters 60, 61 and 62. During a copying operation, the drive motors 63, 64, 65 move the filters 60, 61, 62 into and out of the optical path of the copying station 55 under the control of the exposure control unit 66. Movement of the filters 60, 61, 62 is regulated so as to achieve predetermined proportions of different spectral components in the copying light.

The frame 41 which is to be printed in the copying station 55 rests on a transparent platform 57. The printing station 55 includes a source 56 of copying or printing light, and the copying light is directed onto the frame 41 via a condenser 73 and a reflecting unit 71 which is similar to the reflecting unit 2 of FIG. 1 and is preferably constituted by a DMD. The light which is reflected towards the frame 41 passes through the latter and is focused on the copying paper 59 by an objective 58.

The reflecting unit 71 is controlled by a reflector control unit 72 which, in turn, is connected to the exposure control unit 66. This arrangement makes it possible not only to regulate the spectral composition of the copying light but to additionally provide a spatial modulation, e.g., for the generation of an unsharp mask. The homogenization of the copying light by the condenser 73 is partly canceled in order to illuminate very dense areas of a frame more strongly than less dense areas, for example.

The invention allows electronic images with high resolution and a large dynamic range to be produced at high speed.

Various modifications are possible within the meaning and range of equivalence of the appended claims. For instance, converging objectives or an integrating cylinder, rather than optical fibers, can be employed. Furthermore, instead of DMDs, it is possible to use other reflecting units with independently adjustable reflectors. By way of example, reflecting units having reflectors which can be independently deflected by electron beams may be used.

What is claimed is:

1. A method of scanning an information bearing object using radiation sensing means, comprising the steps of irradiating a set of reflective surfaces corresponding to different regions of said information bearing object with radiation traveling away from or towards said information bearing object; and adjusting said surfaces independently of one another to successively direct radiation from respective ones of said regions to said sensing means.

2. The method of claim 1, wherein the irradiating step comprises projecting an image of said information bearing object onto said surfaces and the adjusting step comprises successively reflecting respective regions of said image to said sensing means.

3. The method of claim 1, wherein the irradiating step comprises conducting radiation to said surfaces from a source of radiation and the adjusting step comprises successively reflecting the conducted radiation to respective ones of said regions and to said sensing means.

4. The method of claim 1, wherein said surfaces have first positions in which said surfaces direct radiation away from said sensing means and second positions in which said surfaces direct radiation towards said sensing means, the adjusting step comprising moving said surfaces from said first positions to said second positions and back to said first positions.

5. The method of claim 1, wherein said set of reflective surfaces comprises a digital micromirror device.

6. The method of claim 5, wherein said device comprises a linear array of micromirrors.

7. The method of claim 5, wherein said device comprises a two-dimensional array of micromirrors.

8. The method of claim 1, wherein said sensing means comprises an optoelectronic sensor.

9. The method of claim 1, further comprising the step of splitting the radiation reflected from said surfaces into a plurality of spectral components upstream of said sensing means.

10. An apparatus for scanning an information bearing object, comprising a set of reflective elements corresponding to different regions of the information bearing object; means for irradiating said elements with radiation; and means for adjusting said elements independently of one another to successively direct radiation from respective regions of the information bearing object to said sensing means.

11. The apparatus of claim 10, wherein said irradiating means comprises means for projecting an image of the information bearing object onto said elements and said elements are arranged to successively reflect respective regions of the projected image to said sensing means.

12. The apparatus of claim 10, wherein said irradiating means comprises a source of radiation, and means for conducting radiation from said source to said elements, said elements being arranged to successively reflect the conducted radiation to respective regions of the information bearing object and to said sensing means.

13. The apparatus of claim 10, wherein said elements have first positions in which Said elements direct radiation away from said sensing means and second positions in which said elements direct radiation towards said sensing means, said adjusting means comprising means for moving said elements from said first positions to said second positions and back to said first positions.

14. The apparatus of claim 10, wherein said set comprises a digital micromirror device.

15. The apparatus of claim 14, wherein said device comprises a linear array of micromirrors.

16. The apparatus of claim 14, wherein said device comprises a two-dimensional array of micromirrors.

17. The apparatus of claim 10, wherein said sensing means comprises an optoelectronic sensor.

18. The apparatus of claim 17, wherein said sensor comprises a photodiode.

19. The apparatus of claim 10, further comprising means for splitting the radiation reflected from said elements into a plurality of spectral components, said splitting means being arranged upstream of said sensing means.

20. The apparatus of claim 19, wherein said sensing means comprises a plurality of sensors for the respective spectral components.

21. An apparatus for copying a master, comprising first means for determining the densities of different regions of the master, said first means including means for scanning the master, and said scanning means comprising a set of reflective elements which respectively correspond to the different regions of the master, means for irridating said elements with radiation traveling away from or towards the master, means for sensing radiation and means for adjusting said elements independently of one another to successively scan the respective regions of the master; second means for making a copy of the master on copy material, said second means including means for exposing the copy material, and means for controlling said exposing means as a function of the densities of the master; and means connecting said first means to said controlling means.

22. The apparatus of claim 21, wherein said first means further comprises a source of radiation arranged to irradiate said elements and said elements are arranged to successively reflect radiation from said source to respective regions of the master.

23. The apparatus of claim 22, wherein said first means further comprises means for splitting radiation from the master into a plurality of spectral components.

24. The apparatus of claim 21, wherein said first means further comprises a source of radiation arranged to irradiate said elements, and means downstream of said elements for projecting images of said elements onto the master.

25. The apparatus of claim 21, wherein said second means comprises a source of radiation, and a set of additional reflective elements arranged to be irradiated by said source and to direct radiation from said source to the copy material, each of said additional reflective elements corresponding to a different region of the copy material, and said second means further comprising means for adjusting said additional reflective elements independently of one another.

* * * * *